(No Model.)
H. J. HOTCHKISS.
MILK COOLER.
No. 583,197. Patented May 25, 1897.
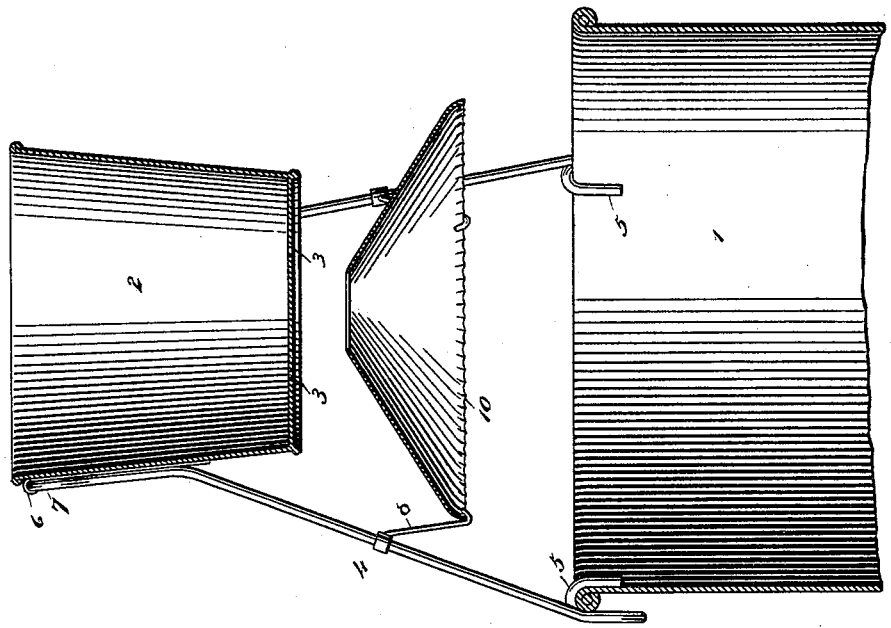
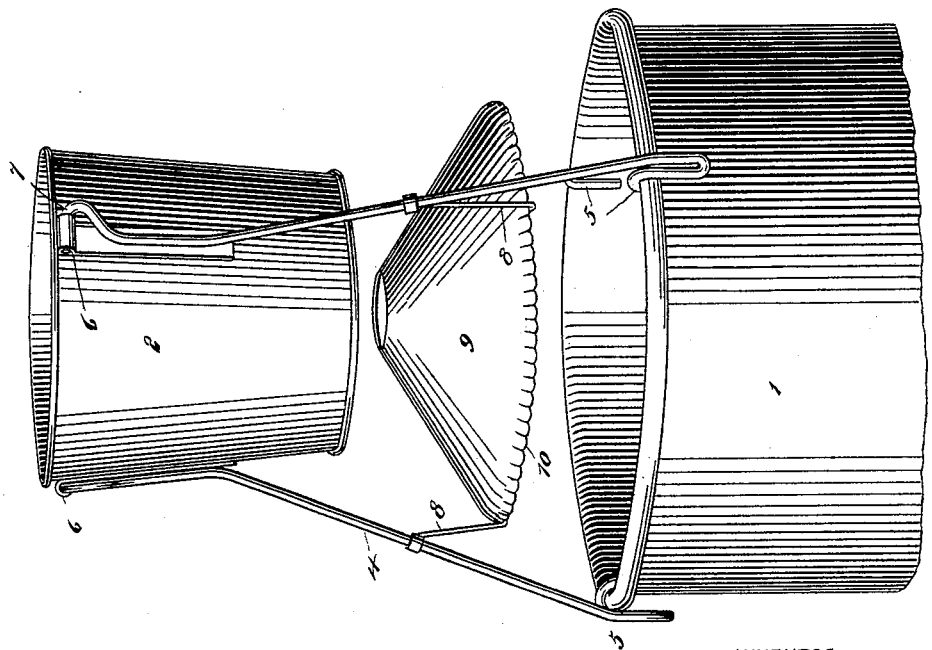
WITNESSES:
Edward Thorpe
J. S. Caplinger
INVENTOR
H. J. Hotchkiss
BY
Munn & Co
ATTORNEYS.

UNITED STATES PATENT OFFICE.

HOMER J. HOTCHKISS, OF ITHACA, NEW YORK.

MILK-COOLER.

SPECIFICATION forming part of Letters Patent No. 583,197, dated May 25, 1897.

Application filed June 6, 1895. Serial No. 551,903. (No model.)

*To all whom it may concern:*

Be it known that I, HOMER J. HOTCHKISS, of Ithaca, in the county of Tompkins and State of New York, have invented a new and Improved Apparatus for Cooling and Aerating Milk, of which the following is a full, clear, and exact description.

My invention relates to milk cooling and aerating devices, and has for its object to provide a simple, inexpensive, and efficient construction and combination of parts which may be readily detached for transportation and storage and which when arranged in operative relation are adapted to be supported over the mouth of a milk-receiving can or its equivalent.

Further objects and advantages of this invention will appear in the following description, and the novel features thereof will be particularly pointed out in the appended claims.

In the drawings, Figure 1 is a perspective view of an apparatus embodying my invention applied in the operative position to a milk-can. Fig. 2 is a central sectional view of the same.

Similar numerals of reference indicate corresponding parts in both figures of the drawings.

1 designates a milk-receptacle, such as a can, above which is supported a distributing reservoir or hopper 2 to receive milk to be cooled and aerated. This reservoir or hopper is provided in its bottom with outlet or discharge perforations 3, which are arranged at an interval from the center of the bottom and may be arranged in an annular series concentric with the bottom of the reservoir, the diameter of the circle described by said series of discharge-openings being greater than that of a central opening formed in the trunco-conical deflector 9, which is arranged beneath the reservoir and is of less diameter at its base or enlarged end than the top of the can 1. The upper surface of this deflector forms the cooling and aerating surface of the apparatus, and it will be seen that all of the liquid discharged through the openings 3 will fall upon said surface at a point below the plane of the central opening of the deflector and hence cannot fall directly through said opening into the receptacle. The object of this central opening in the deflector is to allow an upward current of air, induced by the heat absorbed from the milk by the surface of the deflector and communicated by the latter to the air contained within the deflector, which is constructed wholly of sheet metal. This central opening in the deflector forms a vent through which the heated air rises and escapes, while fresh cool air is supplied at the bottom of the deflector, thereby preserving a uniform temperature of the deflector and accomplishing an efficient cooling of the liquid discharged upon its upper surface.

In order to prevent concentration of the liquid deposited upon the surface of the deflector and the discharge thereof from said surface at a single point of the periphery of the deflector, as in a solid stream, I preferably provide said periphery of the deflector with serrations or scallops, formed by crimping the same to provide short radial grooves 10, between which are points 10$^a$, which depend below the plane of the contiguous portions of the deflector and thereby form drip-points, from which the liquid is discharged in small streams, exposed at all points for contact with atmospheric air.

In the construction illustrated in the drawings I have provided the reservoir 2 with a plurality of spaced horizontal eyes 6, adapted for the reception of horizontal terminal pins 7 at the upper extremities of detachable standards 4, said standards being provided contiguous to the reservoir with straight portions to bear against the surface of the reservoir and thus prevent the lateral displacement or tipping of the apparatus when arranged upon a milk-can. The lower extremities of the standards, the body portions of which are deflected or arranged divergently, are provided with down-turned hooks 5 for engagement with the upper edge of the milk-can, and at intermediate points the straight or body portions of the standards are provided with depending downwardly-convergent supporting-arms 8, which are hooked at their lower extremities to form a seat for the lower periphery of the deflector.

From the above description it will be seen that the deflector can be detached from the other members of the apparatus, and hence may be applied thereto after the standards have been erected to support the reservoir. Furthermore, the standards are detachable from the reservoir to provide for a compact arrangement of the apparatus for purposes of storage and transportation.

The essential feature of the invention, however, resides in the fact that the discharge-openings in the reservoir are so arranged as to discharge upon the upper inclined cooling-surface of the deflector without interfering with an updraft through the latter, such an updraft being indispensable in a device of this class in order to preserve a uniform temperature of the deflecting-surface through continued use. The streams of liquid discharged through the openings 3 are exposed to the air, as are the streams or drops falling from the drip-points at the periphery of the deflector, and while upon the cooling-surface of the deflector the liquid is distributed in a thin film which is exposed at one side to the air and at the other side to the cooling effect of the milk-deflector, which is kept at an even temperature by an updraft of air.

Various changes in the form, proportion, and the minor details of construction may be resorted to without departing from the spirit or sacrificing any of the advantages of this invention.

Having described my invention, what I claim is—

1. A device of the class described, having a reservoir arranged above a liquid-receptacle and provided in its bottom with an annular series of discharge-openings, and a trunco-conical hollow deflector arranged beneath the reservoir and provided at its apex with an opening of less diameter than the series of discharge-openings in the bottom of the reservoir, whereby liquid is deposited upon the surface of the deflector in a plane below that of the opening to allow an upward current of air through the latter, substantially as specified.

2. As an improved article of manufacture, an apparatus for cooling and aerating milk, comprising a distributing-reservoir provided in its bottom with an annular series of discharge-openings and upon its sides with horizontal spaced eyes, downwardly-divergent standards provided at their upper extremities with horizontal pins removably fitted in said eyes and at their lower ends with downturned hooks to engage the upper edge of a receptacle, said standards contiguous to their upper extremities being arranged parallel and in contact with the sides of the reservoir, downwardly-convergent arms attached to the standards at intermediate points and having terminal inturned hooks, and a hollow truncoconical deflector removably seated at its lower edge in said inturned hooks and provided with a central draft-opening of less diameter than the series of discharge-openings in the bottom of the reservoir, substantially as specified.

HOMER J. HOTCHKISS.

Witnesses:
GEORGE S. MOLER,
CLEMENT D. CHILD.